(12) United States Patent
Ryan et al.

(10) Patent No.: US 10,585,915 B2
(45) Date of Patent: *Mar. 10, 2020

(54) DATABASE SHARDING (71) Applicant: International Business Machines Corporation, Armonk, NY (US)

(72) Inventors: Michael Ryan, Claregalway (IE); Claude N. Warren, Jr., Galway (IE)

(73) Assignee: International Business Machines Corporation, Armonk, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 15/793,100

(22) Filed: Oct. 25, 2017

(65) Prior Publication Data

US 2019/0121901 A1 Apr. 25, 2019

(51) Int. Cl.
| | | |
|---|---|---|
| G06F 17/30 | (2006.01) |
| G06F 16/27 | (2019.01) |
| G06F 16/21 | (2019.01) |
| G06F 16/22 | (2019.01) |
| G06F 16/2455 | (2019.01) |

(52) U.S. Cl.
CPC .......... *G06F 16/278* (2019.01); *G06F 16/212* (2019.01); *G06F 16/2237* (2019.01); *G06F 16/24554* (2019.01)

(58) Field of Classification Search
CPC ............. G06F 16/278; G06F 16/24554; G06F 16/2237; G06F 16/212
USPC ....................................... 707/737
See application file for complete search history.

(56) References Cited

U.S. PATENT DOCUMENTS

| | | |
|---|---|---|
| 8,359,201 B1 | 1/2013 | Talbot et al. |
| 8,924,426 B2 | 12/2014 | Chattopadhyay et al. |
| 8,996,463 B2 | 3/2015 | Merriman et al. |
| 9,225,774 B2 | 12/2015 | Kluin et al. |
| 9,275,129 B2 | 3/2016 | Desai et al. |

(Continued)

FOREIGN PATENT DOCUMENTS

WO WO2016064629 A1 4/2016

OTHER PUBLICATIONS

Hall et al.: "Processing a Trillion Cells per Mouse Click", Proceedings of the VLDB Endowment, vol. 5, No. 11, Aug. 27-31, 2012, Istanbul, Turkey (Year: 2012).*
Stanojevic et al.: "Distributed with Differential Privacy", Qatar Computing Research Institute, Hamad Bin Khalifa University 2017 (Year: 2017).*
PCT International Search Report and Written Opinion of the International Searching Authority, dated Jan. 4, 2019, regarding Application No. PCT/EP2018-078495, 14 pages.

(Continued)

Primary Examiner — Kuen S Lu
(74) Attorney, Agent, or Firm — Yee & Associates, P.C.

(57) ABSTRACT

Computer program products and systems are provided for storing records in and retrieving records from a sharded table of a sharded database. The sharded database comprises a plurality of database shards. The database shards are each configured to store a subset of records of the sharded table. The database shards are also each associated with a respective Bloom filter. Records are inserted into the sharded table by generating a respective representation of the sharding key of the record to be stored for use with each of a plurality of the respective Bloom filters. Hamming distances between current values of each of the plurality of Bloom filters and the respective representation of the sharding key for use with that Bloom filter are then calculated and a database shard for storing the record is selected from amongst those database shards based on the calculated Hamming distances.

13 Claims, 4 Drawing Sheets

(56) References Cited

U.S. PATENT DOCUMENTS

| | | | |
|---|---|---|---|
| 9,507,824 B2 * | 11/2016 | Young | G06F 16/24537 |
| 2010/0312749 A1 | 12/2010 | Brahmadesam et al. | |
| 2012/0109888 A1 | 5/2012 | Zhang et al. | |
| 2016/0019227 A1 | 1/2016 | Hendrey | |
| 2016/0110391 A1 | 4/2016 | Korycki et al. | |
| 2016/0154698 A1 | 6/2016 | Kazi | |
| 2016/0188722 A1 | 6/2016 | Skrenta et al. | |
| 2016/0292171 A1 | 10/2016 | Bhagat et al. | |
| 2016/0328429 A1 | 11/2016 | Lipton | |
| 2017/0300490 A1 | 10/2017 | Kachemir et al. | |
| 2018/0357434 A1 * | 12/2018 | Roy | H04L 9/3218 |

OTHER PUBLICATIONS

McKenzie, "How to Calculate Hamming Distance", Leaf Group Ltd., Accessed Oct. 11, 2017, 3 pages. http://classroom.synonym.com/calculate-hamming-distance-2656.html.

Salvi et al., "Bloom Filters and Compact Hash Codes for Efficient and Distributed Image Retrieval", 2016 IEEE International Symposium on Multimedia (ISM), Dec. 2016, 5 pages.

"Shard (database architecture)", Wikipedia, accessed Oct. 11, 2017, 5 pages. https://en.wikipedia.org/wiki/Shard_%28database_architecture%29.

Crainiceanu, "Bloofi: A Hierarchical Bloom Filter Index with Application to Distributed Data Provenance", Proceedings of the 2nd International Workshop on Cloud Intelligence, Aug. 2013, 8 pages.

\* cited by examiner

DATABASE SHARDING

BACKGROUND

1. Field

The present invention relates to sharded databases. In particular, it relates to systems and computer program products for storing and retrieving records in a sharded table of a sharded database.

2. Description of the Related Art

Database sharding is a known technique for splitting a database into a number of smaller parts known as database shards. This technique may also be referred to as horizontal partitioning.

In general, when sharding is applied to a database, each of the database shards is configured to include the same schema as all of the other database shards (this might be the schema for the entire database or for some subset thereof). In other words, each of the database shards includes the same table definitions as each of the other database shards. During the application of the database sharding technique, certain tables may be configured to be sharded tables. This means that the records for those tables will be distributed between the database shards such that the records (or data) that are stored in those tables on each database shard will be different for each database shard. The distribution of the records of a sharded table between the database shards is typically determined based on the value of a sharding key which is derived from one or more fields of the sharded table. For example, the sharding key might be defined as being an 'id' field of the sharded table and records with an 'id' that falls within a first range might be stored in the table on a first database shard, whilst records with an 'id' that falls within a different second range might be stored in the table on the second database shard. Therefore, even though the database shards may have the same schema as each other, they only include a subset of the records for any sharded tables within the schema. In order to retrieve a record from the sharded table, it is first necessary to determine which database shard stores the record of interest. This may be achieved, for example, by determining whether the sharding key falls within a first range or a second range to determine whether the record should have been stored on a first or second database shard respectively.

In addition to sharded tables, a sharded database may also include replicated tables, which are replicated between each of the database shards. This means that each of the database shards includes all of the records for those replicated tables. By including some of the tables of the sharded database as replicated tables, the number of lookups that need to be performed between different database shards can be reduced, thereby improving the performance of the sharded database.

Database sharding may be used to improve the performance of a database. As examples, where a database stores a very large number of records or receives a very large number of queries, database sharding may be used to create a number of database shards which can operate on separate computing devices, improving the capacity of a database system to store large numbers of records or answer a large number of queries. This is because the computing device upon which each database shard is stored can independently handle queries regarding the subset of data stored in that database shard.

In order to maximize the benefit realized from database sharding, it is desirable that the records of the sharded tables be evenly distributed between each of the database shards such that the storage requirements and the computational power required for each of the database shards is roughly balanced. Furthermore, it is also desirable to enable additional database shards to be dynamically added to the sharded database to allow any increases in computational power or storage requirements to be met.

Typically, methods for allocating records to sharded tables in a sharded database do not result in the records being randomly distributed such that the storage requirements and the computational power required for each of the database shards is balanced. For example, a method of distributing records between shards based on whether an 'id' field falls within a first range or a second range means that those records having a lower 'id' might be grouped on the same database shard. If the 'id' is incrementally assigned, such that older records have lower 'id's, this might lead to an imbalance in computing load between the database shards if the newer records are more regularly queried.

Additionally, typical methods for allocating records to sharded tables in a sharded database either do not allow for additional database shards to be dynamically added, or result in increased complexity when database shards are added, leading to decreased performance when retrieving records from the sharded database.

SUMMARY

According to an aspect of the invention, there is provided a system for storing a record in a sharded table of a sharded database. The sharded database comprises a plurality of database shards. The database shards are each configured to store a subset of records of the sharded table. The database shards are also each associated with a respective Bloom filter. The Bloom filter is configured to provide an indication as to whether a record associated with a particular sharding key may have been stored in the database shard with which it is associated. The system comprises obtaining a sharding key for the record to be stored. The sharding key is based on one or more fields of the record. The system further comprises generating a respective representation of the sharding key for use with each of a plurality of the respective Bloom filters. The representation for a given Bloom filter is generated by applying one or more hashing functions used by that Bloom filter to the sharding key. The system further comprises calculating Hamming distances between current values of each of the plurality of Bloom filters and the respective representation of the sharding key for use with that Bloom filter. The system further comprises selecting a database shard based on the calculated Hamming distances and storing the record in the selected database shard.

A Bloom filter is a known data structure which may be used to test whether an element is a member of a set or not. The Bloom filter is a probabilistic data structure which represents the membership of the set in a fixed-length bit vector (or array). Initially, when the set represented by the Bloom filter is empty, each of the bits in the vector is '0'. In addition to the fixed-length bit vector, each Bloom filter has a predetermined number of different hashing algorithms associated with it. These hashing algorithms each map any given element onto a particular bit in the vector. As elements are added to the set represented by the Bloom filter, the Bloom filter applies each of the hashing algorithms to each added element and sets the corresponding bits of the bit vector to which the added element is mapped by the hashing algorithms to '1'.

In order to test whether a particular element is a member of a set represented by the Bloom filter, the hashing algorithms are applied to that element and the bits of the bit vector to which that element is mapped by the hashing algorithms are inspected. If any of the bits to which the element is mapped are '0', then the element is not a member of the set represented by the Bloom filter. However, if the bits to which the element is mapped are all '1', then the element might be a member of the set represented by the Bloom filter.

Whilst a Bloom filter can be used to definitively determine that a particular element is not a member of the set, it may return false positives which incorrectly indicate that a particular element is a member of the set when in reality it is not. This is because the bits to which the element maps might have been set to '1' through the insertion of other elements into the set which also map to those bits. In other words, the Bloom filter can provide one of two outcomes for a given element, namely: (1) that the element is not a member of the set represented by the Bloom filter; or (2) that the element might be a member of the set represented by the Bloom filter. The likelihood of a Bloom filter providing a false positive is determined by the number of bits in the bit vector used by the Bloom filter and the number of different hashing algorithms that are used by it. These parameters can therefore be chosen when implementing a Bloom filter to provide a desired likelihood of receiving false positives from the Bloom filter.

Due to the way in which a Bloom filter represents the membership of the set, it is not possible to delete items from the set represented by the Bloom filter. However, variations on the Bloom filter are known which enable items to be deleted from the represented set. In particular, a Counting filter is a type of Bloom filter which extends each bit in the vector to instead be an n-bit counter, allowing the number of times each bit has been mapped by an inserted element to be recorded. This enables elements to be deleted from the set represented by the Counting filter by determining the locations on the vector to which the element to be delete is mapped by the hashing algorithms and decrementing the n-bit counters at those locations.

The Hamming distance is a measure of the difference between two strings of equal length. The Hamming distance measures the minimum number of substitutions that are required to change one string into the other (i.e., the number of places in which two strings differ from each other). For example, the Hamming distance between the 4-bit binary strings 1001 and 1010 is 2 because the last two bits differ from each other whilst the first two bits are the same.

The inventors have realized that Bloom filters can be used in a sharded database together with Hamming distances to improve the distribution of records in the sharded database. In particular, by basing the selection of a database shard in which to store the record on the Hamming distance between the Bloom filter associated with each database shard and the representation of the sharding key for use with that filter, the proposed embodiments may distribute the records more evenly amongst the database shards of the sharded database. This may improve the performance of the sharded database.

Furthermore, distributing (or assigning) records amongst the database shards based on such Hamming distances may enable the retrieval of records from the database shards to also be improved. For instance, by using the Hamming distance to assign records to the database shards, similar data may be more likely to be co-located. The Bloom filters may then provide a very quick way of eliminating database shards which do not store a particular record.

Each of the respective Bloom filters which are associated with the database shards may, optionally, use the same number of bits and the same hashing functions. By making the Bloom filters the same in terms of the number of bits and hashing functions that they use, only a single representation of the sharding key may need to be generated. This representation may be suitable for use with each of the Bloom filters.

Each of the respective Bloom filters may, optionally, be a counting filter. The use of counting filters may enable records to be deleted and for their deletion to be represented by the counting filters, thereby preventing false positives being provided as a result of the filter matching on the representation of the sharding key for a deleted record.

The database shard which is selected may be a database shard which is associated with a respective Bloom filter for which the calculated Hamming distance is a minimum value from amongst the calculated Hamming distances. By storing records in a database shard for which the Bloom filter is a minimal Hamming distance from the representation of the record used with the Bloom filter, it is believed that each of the Bloom filters may be kept more distinct from each other. This may result, on average, in fewer Bloom filters indicating a match for a particular record leading to a reduction in the number of database shards which need to be searched to retrieve the record. This technique may also serve to balance the assignment of records to each of the database shards, thereby preventing them from diverging too much.

Proposed approaches to distributing the records amongst the database shards may also reduce a false positive rate for the Bloom filters associated with each database shard. This is because the records which are most similar in terms of their representations for use with the Bloom filters may be more likely to be stored on the same database shards and, thus, be more likely to be represented by the same Bloom filter in the sharded database. A reduction in the false positive rate may reduce, on average, the number of database shards which need to be searched to retrieve a particular record.

The selection of the database shard which is associated with a respective Bloom filter for which the calculated Hamming distance is a minimum value from amongst the calculated Hamming distances may comprise selecting the database shard at random from amongst those database shards associated with respective Bloom filters for which the calculated Hamming distance is a minimum value. This may provide an effective way of selecting a database shard when multiple Bloom filters have the same minimum Hamming distance to their respective representations of the sharding key.

The sharded database may, optionally, further comprise an indication of whether each database shard is available or unavailable for storing new records. In this case, the plurality of Bloom filters for which respective representations of the sharding key are generated may not include any Bloom filters associated with database shards which are indicated as being unavailable. This means that database shards which become too full or overloaded may be excluded from consideration for storing any additional records, helping to maintain the performance of each database shard above a minimum level.

Embodiments may, optionally, generate representations of the sharding key for use with the respective Bloom filters associated with all of the database shards which are indicated as being available. In this way, the proposed embodiments may ensure a better distribution of records across the available database shards.

The sharded database may, optionally, comprise a respective insertion counter for counting a respective number of records that have been inserted into each of the database shards. Proposed embodiments may increment the insertion counter for the database shard selected for storing the record. This insertion counter may therefore provide a count of the number of records that have been inserted into each of the database shards.

Proposed embodiments may, optionally, further comprise determining whether the number of records that have been inserted into the selected database shard exceeds a predetermined threshold and, if so, may mark the selected database shard as being unavailable for storing new records. In this way, embodiments may prevent the database shards from becoming over utilized in a way which could degrade the performance of the sharded database.

Embodiments may, optionally, further comprise adding a new database shard and associated Bloom filter to the sharded database. Proposed concepts for storing the records in the sharded database may thus provide the flexibility for new database shards to be inserted into the sharded database. By dynamically inserting new database shards into the sharded database, the capacity and performance of the sharded database may be increased to meet demand. Also, the use of the Hamming distance to select database shards on which to store inserted records may enable the allocation of records across the database shards to re-balance automatically to incorporate the newly inserted database shard.

According to another aspect of the invention, there is provided a system for retrieving a record from a sharded table of a sharded database. The sharded database comprises a plurality of database shards. The database shards are each configured to store a subset of records of the sharded table. The database shards are also each associated with a respective Bloom filter. The Bloom filter is configured to provide an indication as to whether a record associated with a particular sharding key may have been stored in the database shard with which it is associated. The system comprises obtaining a sharding key for the record to be retrieved. The sharding key is based on one or more fields of the record. The system further comprises generating a respective representation of the sharding key for use with each of the Bloom filters associated with the plurality of database shards. The representation for a given Bloom filter is generated by applying one or more hashing functions used by that Bloom filter to the sharding key. The system further comprises identifying which of the respective Bloom filters match with their respective representation of the sharding key. The system further comprises searching the database shards associated with those identified Bloom filters to find and provide the record.

Through the use of Bloom filters associated with each of the database shards, it is likely that a large number of database shards may be eliminated from consideration very quickly and efficiently before an in-depth search of the remaining database shards needs to be conducted. This can improve the efficiency of retrieving records from a sharded table of a sharded database.

Each of the respective Bloom filters which are associated with the database shards may, optionally, use the same number of bits and the same hashing functions. By making the Bloom filters the same in terms of the number of bits and hashing functions that they use, only a single representation of the sharding key may need to be generated. Such a representation may then be suitable for use with each of the Bloom filters.

According to another aspect of the invention, there is provided a computer program product for storing a record in a sharded table of a sharded database. The computer program product comprises a computer readable storage medium. The computer readable storage medium has program instructions, which are executable by a processor, stored thereon. The program instructions are executable by a processor to cause the processor to carry out the steps of the above-mentioned system for storing a record in a sharded table of a sharded database.

According to another aspect of the invention, there is provided a computer program product for retrieving a record from a sharded table of a sharded database. The computer program product comprises a computer readable storage medium. The computer readable storage medium has program instructions, which are executable by a processor, stored thereon. The program instructions are executable by a processor to cause the processor to carry out the steps of the above-mentioned system for retrieving a record from a sharded table of a sharded database.

BRIEF DESCRIPTION OF THE DRAWINGS

Embodiments of the invention will now be described, by way of example only, with reference to the accompanying drawings, in which.

DETAILED DESCRIPTION

In the description that follows and in the figures, certain embodiments of the invention are described. However, it will be appreciated that the invention is not limited to the embodiments that are described and that some embodiments may not include all the features that are described below. It will be evident, however, that various modifications and changes may be made herein without departing from the broader spirit and scope of the invention as set forth in the appended claims. Also, in the context of the present application, where embodiments of the present invention constitute a method, it should be understood that such a method is a process for execution by a computer (i.e., is a computer-implementable method). The various steps of the method therefore reflect various parts of a computer program (e.g., various parts of one or more algorithms).

Figure 1:
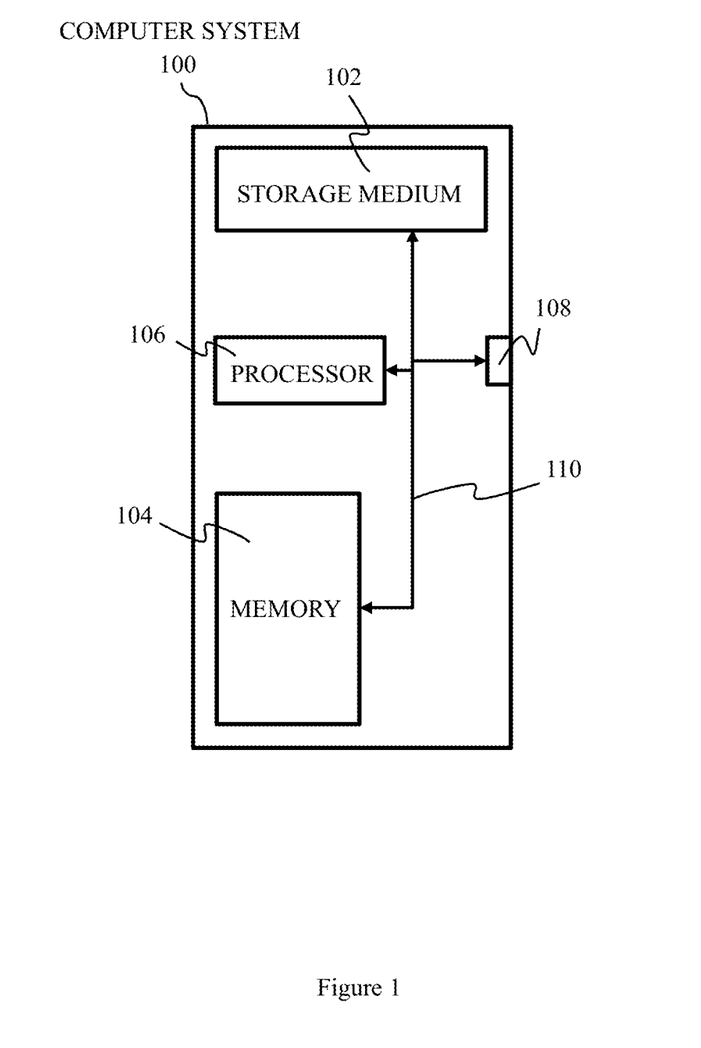
FIG. 1 schematically illustrates an exemplary computer system upon which embodiments of the invention may run.

FIG. 1 of the accompanying drawings schematically illustrates an exemplary computer system 100 upon which embodiments of the present invention may run. The exemplary computer system 100 comprises a computer-readable storage medium 102, a memory 104, a processor 106 and one or more interfaces 108, which are all linked together over one or more communication busses 110. The exemplary computer system 100 may take the form of a conventional computer system, such as, for example, a desktop computer, a personal computer, a laptop, a tablet, a smart phone, a smart watch, a virtual reality headset, a server, a mainframe computer, and so on.

The computer-readable storage medium 102 and/or the memory 104 may store one or more computer programs (or software or code) and/or data. The computer programs stored in the computer-readable storage medium 102 may include an operating system for the processor 106 to execute in order for the computer system 100 to function. The computer programs stored in the computer-readable storage medium 102 and/or the memory 104 may include computer programs according to embodiments of the invention or computer programs that, when executed by the processor 106, cause the processor 106 to carry out a method according to an embodiment of the invention The processor 106 may be any data processing unit suitable for executing one or more computer readable program instructions, such as those belonging to computer programs stored in the computer-readable storage medium 102 and/or the memory 104. As part of the execution of one or more computer-readable program instructions, the processor 106 may store data to and/or read data from the computer-readable storage medium 102 and/or the memory 104. The processor 106 may comprise a single data processing unit or multiple data processing units operating in parallel or in cooperation with each other. The processor 106 may, as part of the execution of one or more computer readable program instructions, store data to and/or read data from the computer-readable storage medium 102 and/or the memory 104.

The one or more interfaces 108 may comprise a network interface enabling the computer system 100 to communicate with other computer systems across a network. The network may be any kind of network suitable for transmitting or communicating data from one computer system to another. For example, the network could comprise one or more of a local area network, a wide area network, a metropolitan area network, the Internet, a wireless communications network, and so on. The computer system 100 may communicate with other computer systems over the network via any suitable communication mechanism/protocol. The processor 106 may communicate with the network interface via the one or more communication busses 110 to cause the network interface to send data and/or commands to another computer system over the network. Similarly, the one or more communication busses 110 enable the processor 106 to operate on data and/or commands received by the computer system 100 via the network interface from other computer systems over the network.

The interface 108 may alternatively or additionally comprise a user input interface and/or a user output interface. The user input interface may be arranged to receive input from a user, or operator, of the system 100. The user may provide this input via one or more user input devices (not shown), such as a mouse or other pointing device, track-ball, or keyboard. The user output interface may be arranged to provide a graphical/visual output to a user or operator of the system 100 on a display, monitor, or screen (not shown). The processor 106 may instruct the user output interface to form an image/video signal which causes the display to show a desired graphical output. The display may be touch-sensitive enabling the user to provide an input by touching or pressing the display.

It will be appreciated that the architecture of the computer system 100 illustrated in FIG. 1 and described above is merely exemplary and that systems having different architectures using alternative components or using more of fewer components may be used instead.

Figure 2:
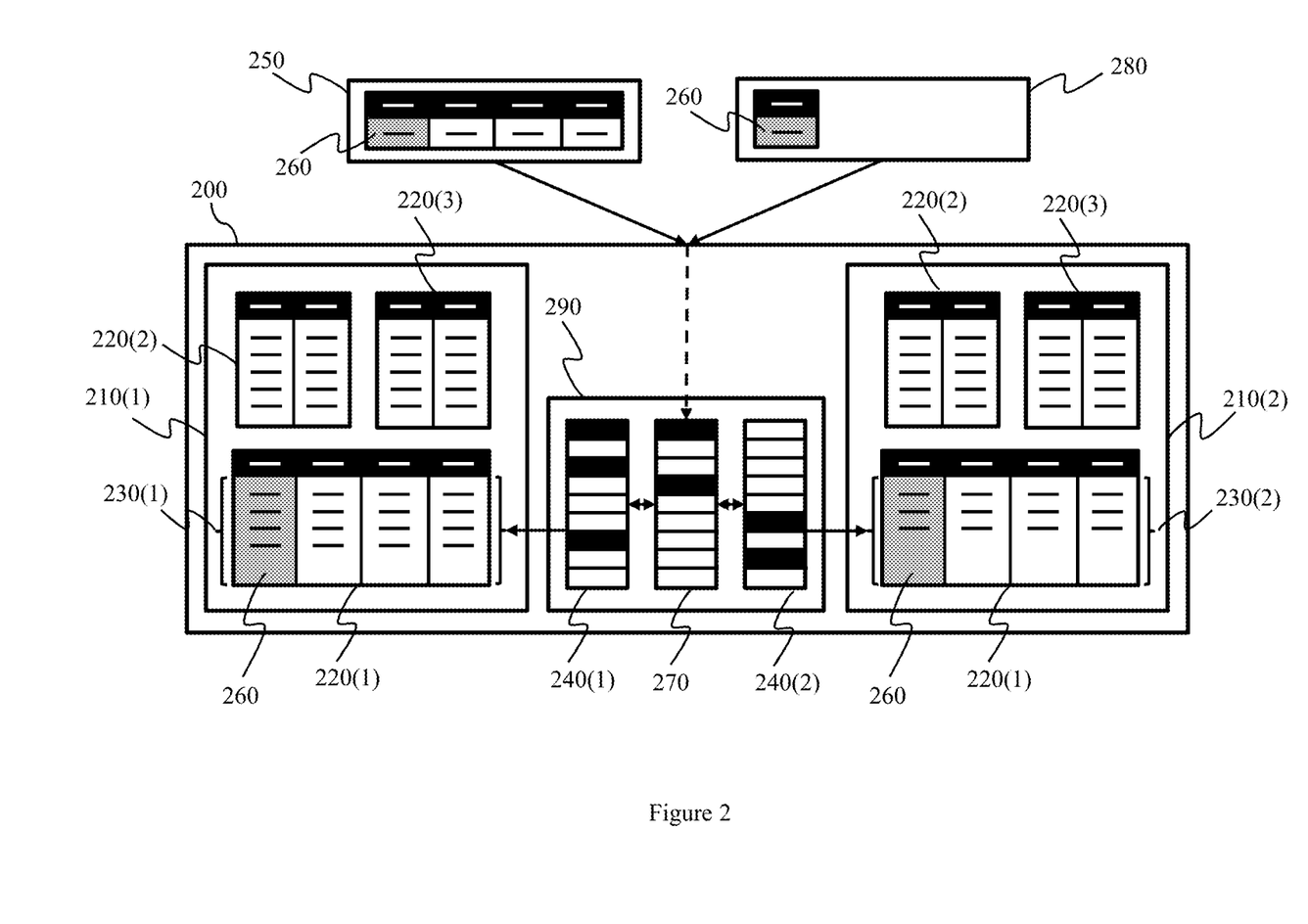
FIG. 2 schematically illustrates an exemplary sharded database according to embodiments of the invention.

FIG. 2 of the accompanying drawings schematically illustrates an exemplary sharded database 200 according to embodiments of the invention. The sharded database 200 comprises a plurality of database shards 210. For example, the sharded database 200 illustrated in FIG. 2 comprises a first database shard 210(1) and a second database shard 210(2). However, it will be appreciated that additional database shards 210 may be used as well. Each of the database shards 210 comprises a common set of one or more tables 220 belonging to the schema of the sharded database 200. It will be appreciated that individual database shards may include additional tables as well, if required (e.g., as part of a separate vertical partitioning of the database).

The common set of one or more tables 220 includes a sharded table 220(1). Whilst the schema for the sharded table 220(1) is the same between the plurality of database shards 210, the set of records 230 stored in the copies of the sharded table 220(1) on each of the database shards 210 is different. In particular, each of the database shards 210 stores a subset of records belonging to the sharded table 220(1). For example, the sharded database 200 illustrated in FIG. 2 has a first subset of records 230(1) belonging to the sharded table 220(1) stored on the first database shard 210(1) and a second subset of records 230(2) stored on the second database shard 210(2). However, it will be appreciated that if more database shards 210 are used with the sharded database 200, the set of records 230 for the sharded table 220 may be broken up into more subsets and distributed across the database shards 210 accordingly.

Some of the tables 220(2) and 220(3) belonging to the common set of tables 220 may be replicated tables. This means that the copies of the replicated tables 220(2) and 220(3) on each of the database shards 210 are identical and include the same set of records as each other. However, it will be appreciated that the common set of tables 220 need not necessarily include any replicated tables.

The sharded database 200 further comprises one or more Bloom filters 240, one for each of the plurality of database shards 210. Each of the Bloom filters 240 is configured to provide an indication as to whether a particular record of the shared table 220(1) has been stored in the database shard 210 with which it is associated. To do this, the Bloom filters 240 maintain a fixed-size bit vector which represents the subset 230(1) or 230(2) of records which have been inserted into their respective database shards 210. For example, the sharded database 200 illustrated in FIG. 2, has a first bloom filter 240(1) associated with the first database shard 210(1) and a second bloom filter 240(2) associated with the second database shard 210(2), the bit vectors of each of the bloom filters 240 includes some bits which have been set to '1' (represented by black shading on the table representation of the bit vectors illustrated in FIG. 2) as a result of records that have already been stored in their respective database shards 210. It will be appreciated that where the sharded database 200 comprises additional database shards 210, each additional database shard 210 will be associated with its own bloom filter 240 representing the subset of records stored in that database shard 210. The representation of the subset 230(1) and 230(2) of records that is maintained by each of the Bloom filters is based upon a sharding key 260 of each record, as discussed further below.

Figure 3:
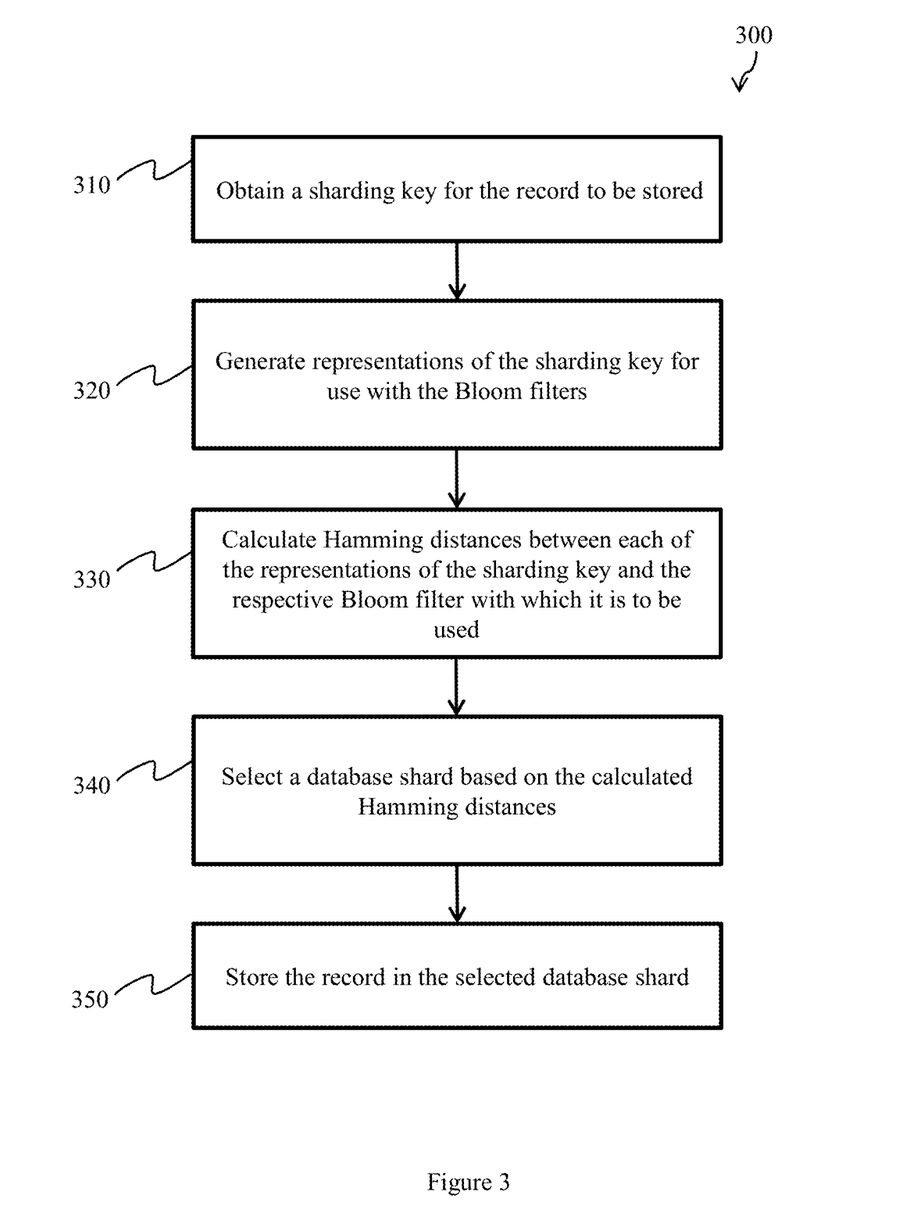
FIG. 3 is a diagram that schematically illustrates a computer-implemented method for storing a record in a sharded table of the sharded database according to embodiments of the invention.

The sharded database 200 illustrated in FIG. 2 will now be discussed further with reference to FIG. 3 which is a diagram that schematically illustrates a computer-implemented method 300 for storing a record 250 in the sharded table 220(1) of the sharded database 200 according to embodiments of the invention.

At a step 310, the method 300 obtains a sharding key 260 for the record 250 to be stored. The sharding key 260 is based on one or more fields of the records that are inserted into the sharded table 220(1). In its simplest form, the sharding key 260 may be derived from a single field, such as an "id" field. However, other more complex composite sharding keys 260 may be used instead including, for example, a composite key derived from some or all of the fields of each record. The sharding key 260 may be provided together with the record to be stored, or may be generated from one or more fields of the record to be stored. The sharding key 260 may serve to uniquely identify each record of the sharded table 220(1) from amongst the set of records 230 belonging to the sharded table 220(1). However, this need not be the case. Instead, the sharding key may be formed such that multiple different records may be associated with the same sharding key.

At a step 320, the method 300 generates one or more representations 270 of the sharding key 260 for use with the Bloom filters 240 associated with the database shards 210. This representation 270 of the sharding key 260 is generated by applying the hashing functions used by each of the Bloom filters 240 to the sharding key 260 resulting in the generation of a bit vector representation 270 of the sharding key 260, which is the same length as the bit vector representation of the subset of records 230(1) and 230(2) that is maintained by each of the Bloom filters 240. The Bloom filters 240 that are used for each database shard 210 may be the same as each other in terms of the length of the bit vector and the hashing functions that they use (although the values of each Bloom filter 240 will of course differ depending on the records that have been inserted in each associated database shard 210). In this case, only a single representation 270 of the sharding key 260 needs to be generated, since the representation 270 will be the same for all of the Bloom filters 240. However, it will be appreciated that some (or all) of the Bloom filters 240 may differ in construction, having either a different length bit vector or making use of different (or a different number of) hashing algorithms. In this case, a representation 270 of the sharding key 260 will need to be generated for each different construction of Bloom filter 240. In the exemplary sharded database 200 illustrated in FIG. 2, for example, a single representation 270 of the sharding key 260 for the record 250 to be stored may be generated for use with both of the Bloom filters 240 since they are the same. In this example, applying the hashing algorithms for the Bloom filters 240 to the sharding key 260 of the record 250 to be inserted generates a bit vector representation of '100100000'. However, it will be appreciated that different records will result in different bit vector representations being generated.

At a step 330, the method 300 calculates the Hamming distance between the bit vector representation 270 of the sharding key 260 generated for each of the Bloom filters 240 and the value of the Bloom filter 240 (representing the subset 230(1) and 230(2) of records that have already been stored on each of the database shards 210). Returning to the exemplary sharded database 200 illustrated in FIG. 2, that the bit vector representation of the first subset of items 230(1) stored in the first database shard 210(1) maintained by the first Bloom filter 240(1) is '101000100' whilst the bit vector representation of the second subset of items 230(2) stored in the second database shard 210(2) maintained by the second Bloom filter 240(2) is '000001010'. Therefore, in this example, the Hamming distance between the representation 270 of the sharding key 260 for the record 250 to be stored and the first Bloom filter 240(1) is '3' (since they differ in 3 separate places), whilst the Hamming distance to the second Bloom filter 240(2) is '4' (since they differ in 4 places).

At a step 340, the method 300 selects a database shard 210 based on the calculated Hamming distances. That is to say, the selection of a database shard 210 is based on a function of the Hamming distances. As an example, the database shard 210 that is selected may be a database shard 210 which is associated with a Bloom filter 240 having a minimum Hamming distance from the representation 270 of the sharding key 260 for the record 250 to be stored. It will be appreciated that in some cases, only a single database shard 210 will be associated with a Bloom filter having a minimum Hamming distance. In such cases, the selection of the database shard 210 may be automatic (i.e., that single database shard 210 which is associated with a Bloom filter which has the minimum Hamming distance). However, in other cases, the minimum Hamming distance may be provided by multiple Bloom filters 240. For example, several Bloom filters might have the same Hamming distance which is a minimum distance amongst the calculated Hamming distances. In such cases, the database shard 210 may be selected from amongst those database shards whose Bloom filters have the minimum Hamming distance criteria. For example, the database shard 210 may be selected at random from amongst those database shards which have the same Hamming distance which is a minimum distance amongst the calculated Hamming distances. However, other means for selecting the database shard 210 may be used instead. For example, the database shard 210 which has the fewest records stored on it may be selected from amongst those database shards 210 which satisfy the minimum Hamming distance criteria. Various other factors or methods for making the selection based on the Hamming distance will be readily apparent to the skilled person. Returning to the example illustrated in FIG. 2, the first database shard 210(1) is selected as the location for storing the record 250 because the Hamming distance between the representation 270 of the sharding key 260 and the first Bloom filter 240(1) has the minimum value of '3', out of the calculated Hamming distances of '3' and '4' for the first and second Bloom filters 240(1) and 240(2), respectively.

At a step 350, the method 300 stores the record 250 in the selected database shard 210. When the record 250 is stored in the database shard 210, the Bloom filter 240 associated with the database shard 210 is updated to represent that that record 250 is now part of the subset of items represented by that Bloom filter 240. In the example illustrated in FIG. 2, the first Bloom filter 240(1) would therefore be updated to add the bit vector representation 270 of the sharding key 260 for the record 250 such that the bit vector representation that is maintained by the Bloom filter 240(1) becomes '101100100'. By updating the Bloom filters 240 whenever records are stored in the database shards 210 with which they are associated, the representation of the subset of records which they maintain will accurately reflect the records stored on each database shard 210.

As more records are stored on the database shards 210 of the sharded database 200, some of the database shards 210 may reach a level where it is desirable to prevent any further records being stored on those database shards 210 to prevent the performance of those database shards 210 (and therefore the sharded database 200 as a whole) from falling below a certain level. To assist with this, the sharded database 200 may further comprise an indication (or marking) of whether each database shard is available or unavailable for storing new records. For example, the sharded database 200 may include a binary flag associated with each database shard 210 to represent whether the database shard 210 is available or not (although other techniques for indicating the availability of the database shards 210 for storing new records may be used instead). When such an indication of the availability of each database shard 210 for storing new records is present, the method 300 may exclude those database shards 210 which are indicated as being unavailable for storing new records from consideration. That is to say, when the method 300 generates the one or more representations 270 of the sharding key 260 at step 320, it may not generate representations for use with any Bloom filters 240 which are associated with database shards 210 which are indicated as being unavailable. Instead, the method 300 may only generate representations 270 for use with each of the Bloom filters 240 (or some subset thereof) which are indicated as being available for storing new records. The method 300 may then proceed to calculate the Hamming distances with each of the Bloom filters for which the representations 270 that have been generated, such that only those databases shards 210 which are available for storing new records will be considered when selecting a database shard based on the Hamming distance.

In order to determine when the number of records stored in a database shard 210 has reached a level at which it should be marked as being unavailable for storing new records, the sharded database 200 may comprise an insertion counter associated with each of the database shards 210. By incrementing the insertion counter whenever a record is stored on the database shard 210 with which it is associated, the insertion counter may be used to determine the current number of records that have been inserted into each of the database shards 210 at any given time. A predetermined threshold may be set for the number of records that each of the database shards 210 may store. This predetermined threshold may be the same for all database shards 210 in the sharded database 200 or may be set differently for each database shard 210 to account for any differences in resources available to that database shard 210. The method 300 may therefore determine whether the number of records that have been inserted into any of the database shards 210 exceeds the predetermined threshold for that database shard 210 and, if so, may mark the database shard 210 as being unavailable for storing any new records. This determination may be performed whenever a record is stored by the method 300 by considering whether the number of records stored in the database shard 210 selected at step 340 exceeds the predetermined threshold for that database shard 210. However, this determination may also be carried out independently from the method 300 for storing new records, such as, for example, being carried out by a database management system which is responsible for managing the sharded database 200 on a periodic basis.

In order to increase the capacity or performance of the sharded database 200, additional database shards 210 may be dynamically added to the sharded database 200. This may be performed, for example, as part of method 300 whenever a database shard 210 is marked as being unavailable for storing new records so as to maintain a predetermined number of database shards 210 which are available for storing new records. However, the insertion of a new database shard 210 may also be performed independently from the method 300, such as by a database management system which is responsible for managing the sharded database 200. Such a database management system may, for example, continuously monitor the sharded database 200 and add a new database shard 210 to the sharded database 200 as needed in order to maintain a predetermined level of performance.

When a new database shard 210 is added to the sharded database 200, a new empty Bloom filter 240 is also added which is associated with the new database shard 210. Due to the operation of the Bloom filters 240 in the sharded database 200, new records will start to be stored in the new database shard 210 in a manner which serves to balance the stored records across those database shards 210 which are available for storing new records. This is because, the Bloom filters for the database shards 210 which have more records stored on them are likely to include a large number of bits that are set to '1'. Therefore, the more records that are stored on the pre-existing database shards 210, the more likely it is that the representation 270 of the sharding key 260 for any new records will be closer, in terms of Hamming distance, to the empty Bloom filter 240 for the newly added database shard 210 (which initially has all bits of its bit vector set to '0') than they are to the pre-existing Bloom filters 240. This means that new records are initially more likely to be stored on the new database shard than the pre-existing ones.

Figure 4:
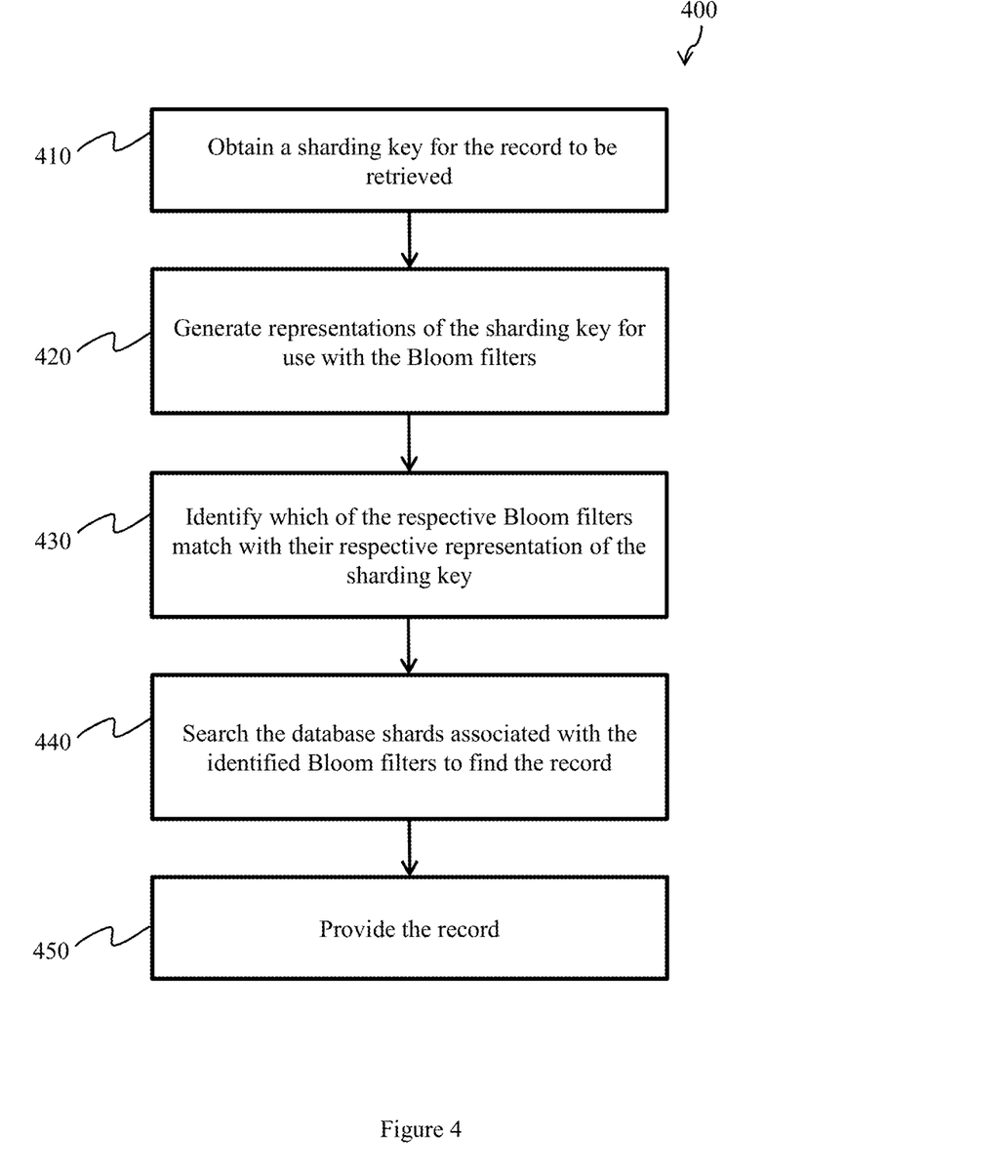
FIG. 4 is a diagram that schematically illustrates a computer-implemented method for retrieving a record from the sharded table of the sharded database according to embodiments of the invention.

FIG. 4 is a diagram that schematically illustrates a computer-implemented method 400 for retrieving a record from the sharded table 220(1) of the sharded database 200.

At a step 410, the method 400 obtains the sharding key 260 for the record which is to be retrieved. As described above in relation to step 310 of the method 300 for storing a record in the sharded database 200, the sharding key 260 is based on one or more fields of the record. The sharding key 260 for the record to be retrieved may be provided as an input to the method 400, for example, as part of a request 280 to retrieve the record(s) associated with that sharding key 260. Alternatively, the sharding key 260 may be derived from data that is provided as part of the request 280 about the record(s) that are to be retrieved.

At a step 420, the method 400 generates representations 270 of the sharding key 260 for use with the Bloom filters 240. As described above in relation to step 320 of the method 300 for storing a record in the sharded database 200, a representation of the sharding key 260 for use with a particular Bloom filter 240 is generated by applying the hashing functions for that Bloom filter 240 to the sharding key 260. Since each of the database shards 210 will need to be considered when retrieving records (including any marked as being inactive for storing new records), a representation 270 of the sharding key 260 is generated for use with each of the Bloom filters. However, again, where the Bloom filters 240 that are used for each database shard 210 are the same shape as each other (i.e., where the length of the bit vectors and the hashing functions used for each Bloom filter are the same), then only a single representation 270 of the sharding key 260 needs to be generated, since the representation 270 will be the same for all of those Bloom filters 240.

At a step 430, the method 400 identifies which of the respective Bloom filters 240 match with their respective representation 270 of the sharding key 260. To determine whether a representation 270 of the sharding key 260 matches its respective Bloom filter 240, the bit vector of the Bloom filter 240 is analysed to determine whether any of the bits at the locations onto which the sharding key 260 is mapped by the hashing algorithms are '0'. If any of the bits onto which the sharding key 260 maps are '0', then the representation 270 of the sharding key 270 does not match the Bloom filter 240, indicating that the record to which the sharding key 270 relates has not been stored on the database shard 210 associated with that Bloom filter 240. However, if all of the bits are '1', the representation 270 of the sharding key 260 matches the Bloom filter 240 indicating that the record to which the sharding key 260 relates may be stored on the database shard 210 associated with that Bloom filter 240.

It will be appreciated that the generation of the representations 270 at step 420 of the method 400 may be implicitly performed as part of determining Bloom filters which match the sharding key 260 at step 430 of the method 400. That is to say, rather than explicitly calculating a bit vector representation 270 of the sharding key 260, the method 400 may implicitly calculate the representation 270 by determining which locations of the bit vectors of each of the Bloom filters the sharding key 260 maps onto by applying the hashing algorithms of each Bloom filter to the sharding key 260.

At a step 440, the method 400 searches the database shards 210 associated with the identified Bloom filters 240 to find the record. Due to the probabilistic nature of the Bloom filters 240, it is possible that more than one of the Bloom filters 240 may indicate a match with the representation 270 of the sharding key 260. This occurs when a false positive is provided by one or more of the Bloom filters 240. Therefore, the method 400 searches each of the database shards 210 associated with Bloom filters 240 which indicated a match with the representation 270 of the sharding key 260 in order to find the record.

At a step 450, the method 400 provides the record. The record may be provided in direct response to a request from an external system or may be provided as a response to an internal request as part of a larger query operation.

In order to more clearly describe the invention, the above described sharded database 200 and associated methods 300 and 400 have been discussed, and illustrated in FIG. 2, using a sharded database 200 having a single sharded table 220(1). However, it will be appreciated that the sharded database 200 may include multiple sharded tables 220 whose records are distributed between the database shards 210. In this case, multiple Bloom filters 240 may be associated with each database shard 210, one for each of the sharded tables 220. The methods 300 and 400 for storing and retrieving records from the sharded tables may then refer to the relevant Bloom filters 240 for the sharded table 220 upon which the methods are operating.

The above-described sharded database 200 may be stored on a system comprising a plurality of computer systems (or devices) 100. Each of the database shards 210 of the sharded database 200 may be stored on a respective computer system 100 of the system, such that each of the computer systems 100 stores one or more of the plurality of database shards 210. The system further comprises a controller 290 which is configured to perform the above-described method 400 for retrieving records from the sharded table 220(1) of the sharded database 200. As illustrated in FIG. 2, the controller 290 may be logically separate from the database shards 210 and could be implemented on a separate computer system 100. Alternatively, the controller 290 could be implemented on a single computer system 100 which is also used to store one or more of the database shards 210. Any requests 280 to retrieve a record from the sharded table 220(1) of the sharded database 200 may then be directed towards the single controller 290. Alternatively, the controller 290 may be distributed between multiple (or all of the) computer systems 100 that are used to store one or more of the database shards 210. In this case, requests 280 to retrieve a record from the sharded table 220(1) of the sharded database 220 may be directed towards the controller on any of the computer systems 100 on which it is located.

The controller 290 may also be configured to store a record 250 in the sharded table 220(1) of the sharded database 200 using the above described method 300. Accordingly, requests to store a record 250 may also be directed to any of the computer systems 100 on which the controller 290 is resident.

The controller 290 may also be configured to allow records to be deleted from the sharded table 220(1) of the sharded database 200. This may be performed by locating the database shard 210 on which the record is located and removing the record from the subset 230 of records of the sharded table 220(1) that are stored on that database shard 210. However, due to the limitations of Bloom filters, it is not possible to update the Bloom filter 240 which is associated with that database shard 210 to reflect the removal of the record from the set of records which it represents. Therefore, the more records that are deleted from a database shard 210, the more likely it is that the Bloom filter 240 for that database shard 210 will return a false positive when attempting to retrieve records from the sharded table 220(1). To address this issue, the sharded database 200 may comprise a deletion counter associated with each of the database shards 210. By incrementing the deletion counter whenever a record is deleted from the database shard 210 with which it is associated, the deletion counter may be used to determine how many records are included in each Bloom filter's representation of the set of records which are no longer stored on their associated database shard 210. The controller 290 may then determine whether the number of records that have been deleted from a particular database shard 210 exceeds a predetermined threshold for that shard and, if so, may rebuild the Bloom filter 240 from the records currently stored in that database shard 210. The deletion counter for the database shard 210 with which the rebuilt Bloom filter is associated may then be reset.

Rebuilding the Bloom filter 240 essentially involves resetting its bit vector such that each bit is set to '0' and re-adding each of the records for the sharded table 220(1) that are stored in that database shard 210 to the bit vector, by reapplying the hashing algorithms for the Bloom filter 240 to the sharding keys 260 of the stored records and setting the appropriate bits of the Bloom filter to '1'. Whilst the Bloom filter 240 is being rebuilt, the database shard 210 may temporarily be marked as unavailable for storing new records, thereby allowing the sharded database 200 to continue to accept new records for storage even whilst the Bloom filters 240 associated with one or more of the database shards 210 may be being rebuilt. Similarly, prior to the Bloom filter 240 being rebuilt, the current value of its bit vector (or array) may be cached, allowing the sharded database 200 to continue to retrieve records from the sharded table 220(1) even whilst the Bloom filter 240 associated with one or more of the database shards 210 may be being rebuilt.

In an alternative embodiment, the above-described sharded database 200 may comprise counting filters instead of the Bloom filters. As described above, counting filters allow records to be removed from the representation of the set of records that is maintained by the counting filter. Therefore, in this alternative embodiment, when a record is deleted from the sharded table 220(1), the controller 290 may update the counting filter associated with the database shard 210 from which the record was deleted, without needing to rebuild the filter. In order to calculate the Hamming distance to a counting filter, the values of the counting filter may be flattened down to a bit vector representation. In other words, the n-bit counter at each position in the vector maintained by the counting filter may be converted to a single bit representation which is '0' if the value of the n-bit counter is '0' or '1' if the value of the n-bit counter is greater than '0'. As an example, if the current value of a counting filter is "01023002", this may be flattened down to a bit vector representation of "01011001" for the purposes of calculating the Hamming distance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for storing a sharded database, the sharded database comprising a plurality of database shards, each of the database shards being configured to store a subset of records of the sharded table and being associated with a respective Bloom filter which is configured to provide an indication as to whether a record associated with a particular sharding key may have been stored in that database shard, the system comprising:
 a plurality of computing systems, each computing system being configured to store one or more of the plurality of database shards; and
 a controller, wherein the controller is configured to retrieve a record from a sharded table of the sharded database by:
  obtaining a sharding key for the record to be retrieved, the sharding key being based on one or more fields of the record;
  generating, for each of the respective Bloom filters associated with each of the database shards, a respective representation of the sharding key for use with that Bloom filter by applying one or more hashing functions used by that Bloom filter to the sharding key;
  identifying which of the respective Bloom filters match with their respective representation of the sharding key;
  searching the database shards associated with the identified Bloom filters to find the record; and
  providing the record.

2. The system according to claim 1, wherein each of the respective Bloom filters uses the same number of bits and the same hashing functions.

3. The system according to claim 1, wherein each of the respective Bloom filters is a counting filter.

4. The system according to claim 1, wherein the controller is further configured to store a record in the sharded table of the sharded database by:
 obtaining a sharding key for the record to be stored, the sharding key being based on one or more fields of the record;
 generating, for each of a plurality of the respective Bloom filters, a respective representation of the sharding key for use with that Bloom filter by applying one or more hashing functions used by that Bloom filter to the sharding key;
 calculating Hamming distances between current values of each of the plurality of Bloom filters and the respective representation of the sharding key for use with that Bloom filter;
 selecting a database shard based on the calculated Hamming distances; and
 storing the record in the selected database shard.

5. The system according to claim 4, wherein selecting a database shard comprises selecting a database shard which is associated with a respective Bloom filter for which the calculated Hamming distance is a minimum value from amongst the calculated Hamming distances.

6. The system according to claim 4, wherein the sharded database further comprises an indication of whether each database shard is available or unavailable for storing new records, and wherein the plurality of Bloom filters for which respective representations of the sharding key are generated when storing the record does not include any Bloom filters associated with database shards which are indicated as being unavailable.

7. The system according to claim 4, wherein the sharded database further comprises a respective insertion counter for counting a respective number of records that have been inserted into each of the database shards, and wherein the controller is further configured to increment the insertion counter for the selected database shard when the record is stored.

8. The system according to claim 7, wherein the controller is further configured to:
 determine whether the number of records that have been inserted into the selected database shard exceeds a predetermined threshold; and
 mark the selected database shard as being unavailable for storing new records in response to determining that the number of records that have been inserted into the selected database shard does exceed the predetermined threshold.

9. The system according to claim 4, wherein the controller is further configured to:
 add a new database shard and associated Bloom filter to the sharded database.

10. The system according to claim 4, wherein the sharded database further comprises a respective deletion counter for counting a respective number of records that have been deleted from each of the database shards.

11. The system according to claim 10, wherein the controller is further configured to:
 determine whether the number of records that have been deleted from a particular database shard exceeds a respective predetermined threshold for that database shard; and rebuild the Bloom filter for that database shard based on the records currently stored in that database shard in response to determining that the number of records that have been deleted from the particular database shard exceeds the respective predetermined threshold for that database shard.

12. A computer program product for storing a record in a sharded table of a sharded database, the sharded database comprising a plurality of database shards, each of the database shards being configured to store a subset of records of the sharded table and being associated with a respective Bloom filter which is configured to provide an indication as to whether a record associated with a particular sharding key may have been stored in that database shard, the computer program product comprising a computer readable storage medium having encoded thereon:
 first program instructions executable by a processor to cause the processor to obtain a sharding key for the record to be stored, the sharding key being based on one or more fields of the record;
 second program instructions executable by the processor to cause the processor to generate, for each of a plurality of the respective Bloom filters, a respective representation of the sharding key for use with that Bloom filter by applying one or more hashing functions used by that Bloom filter to the sharding key;
 third program instructions executable by the processor to cause the processor to calculate Hamming distances between current values of each of the plurality of Bloom filters and the respective representation of the sharding key for use with that Bloom filter;
 fourth program instructions executable by the processor to cause the processor to select a database shard based on the calculated Hamming distances; and fifth program instructions executable by the processor to cause the processor to store the record in the selected database shard.

13. A computer program product for retrieving a record from a sharded table of a sharded database, the sharded database comprising a plurality of database shards, each of the database shards being configured to store a subset of records of the sharded table and being associated with a respective Bloom filter which is configured to provide an indication as to whether a record associated with a particular sharding key may have been stored in that database shard, the computer program product comprising a computer readable storage medium having encoded thereon:

first program instructions executable by a processor to cause the processor to obtain a sharding key for the record to be retrieved, the sharding key being based on one or more fields of the record;

second program instructions executable by the processor to cause the processor to generate, for each of the respective Bloom filters associated with each of the database shards, a respective representation of the sharding key for use with that Bloom filter by applying one or more hashing functions used by that Bloom filter to the sharding key;

third program instructions executable by the processor to cause the processor to identify which of the respective Bloom filters match with their respective representation of the sharding key;

fourth program instructions executable by the processor to cause the processor to search the database shards associated with the identified Bloom filters to find the record; and     fifth program instructions executable by the processor to cause the processor to provide the record.

\* \* \* \* \*